United States Patent [19]
Shih et al.

[11] Patent Number: 5,981,627
[45] Date of Patent: Nov. 9, 1999

[54] EPOXY MODIFIED CORE-SHELL LATICES

[75] Inventors: Yen-Jer Shih, Somerset; Arthur B. Pruiksma, Chester, both of N.J.

[73] Assignee: National Starch and Chemical Investment Holding Corporation, Wilmington, Del.

[21] Appl. No.: 07/959,011

[22] Filed: Oct. 9, 1992

Related U.S. Application Data

[63] Continuation-in-part of application No. 07/628,803, Dec. 14, 1990, Pat. No. 5,177,122, which is a continuation-in-part of application No. 07/389,012, Aug. 2, 1989, abandoned.

[51] Int. Cl.$^6$ ..................................................... C08K 3/20
[52] U.S. Cl. ........................... 523/201; 523/402; 523/407; 523/412; 523/414; 523/420; 523/423; 524/271; 524/272; 524/457
[58] Field of Search ..................................... 523/201, 402, 523/407, 412, 414, 420, 423; 524/271, 272, 457

[56] References Cited

U.S. PATENT DOCUMENTS

| | | | |
|---|---|---|---|
| 4,285,847 | 8/1981 | Ting | 524/457 |
| 4,443,568 | 4/1984 | Woo | 523/406 |
| 4,521,490 | 6/1985 | Pocius et al. | 428/416 |
| 4,973,614 | 11/1990 | Yoshino | 523/407 |
| 5,177,122 | 1/1993 | Shih | 523/201 |

FOREIGN PATENT DOCUMENTS 63-223 018  9/1988  Japan .

OTHER PUBLICATIONS

*Handbook of Adhesives,* 3rd Ed., Edited by Skeist, Van Nostrand Reinhold, New York, 1989, pp. 437–449.

Primary Examiner—Bernard Lipman
Attorney, Agent, or Firm—Eugene Zagarella, Jr.

[57] ABSTRACT

This invention relates to stable one-part latex compositions prepared by aqueous emulsion polymerization wherein a core-shell polymer is formed, the core formed by emulsion polymerization of an ethylenically unsaturated monomer in the presence of an epoxy resin and the shell polymer formed by emulsion polymerization of a hydroxy carboxyl containing monomer composition in the presence of the core, providing that the monomers in both the core and the shell do not contain amino functional groups, and post-adding to the formed core-shell polymer an organic compound having at least one amino functional group which is available for later reaction with the epoxy resin upon drying to produce a crosslinked polymer product.

18 Claims, No Drawings

EPOXY MODIFIED CORE-SHELL LATICES

This application is a continuation-in-part of application Ser. No. 07/628,803 filed Dec. 14, 1990, now U.S. Pat. No. 5,177,122, issued Jan. 5, 1993, which is a continuation-in-part of application Ser. No. 07/389,012 filed Aug. 2, 1989, now abandoned.

BACKGROUND OF THE INVENTION

The present invention relates to one-part latex compositions prepared by a "core-shell" multistage polymerization process. In particular this invention relates to latices of polymeric particles having a polymeric core formed by polymerization of one or more ethylenically unsaturated monomers in the presence of an epoxy resin; and a polymeric shell formed on the core by emulsion polymerization of one or more ethylenically unsaturated monomers and a hydroxyl or carboxyl functional monomer in the presence of the core, providing that the monomers in both the core and the shell do not contain amino functional groups; and post-adding an organic compound having amino functional groups, wherein the amino groups react with the epoxy resin upon drying to produce a crosslinked polymer product.

The one-part latex compositions of the present invention can be used as heat resistant, flexible binders in the formation of nonwoven mats; as laminating adhesives which form flexible laminates having high bonding strength and a high degree of humidity and water resistance; as laminates of woven and non-woven fabrics, coated and uncoated paper and paper boards, flexible films of polyethylene; as contact adhesives, and the like.

The term core-shell structure has become well-understood in the art as defining a layered particulate composition having a polymeric center or core surrounded by a shell or overcoat formed of a second polymeric material. Methods for the preparation of such core-shell particulate compositions are well known in the art and include a variety of layered particulate materials having a core and one or more shell layers. For example, U.S. Pat. No. 3,661,994 discloses graft polymers formed by a sequential polymerization process, wherein a rigid, polymeric seed or core is surrounded by a graft polymerized rubber layer, and optionally encapsulated with a graft polymerized rigid outer layer. Fusion of the shell component occurs during thermal processing, such that the core-shell nature of the product is no longer discernable.

Japanese Patent No. 63-223018A also discloses the preparation of core-shell polymers. The core contains water insoluble epoxy resins dissolved in unsaturated ethylene monomer(s) which are polymerized to form emulsion polymer particles. The shell contains unsaturated ethylene monomer(s) having amine groups which are copolymerized with other unsaturated ethylene monomers. The weight ratio of the unsaturated ethylene monomer(s) to the epoxy resin in the core is 1:1 to 2:1, and the weight ratio of the unsaturated ethylene monomer(s) containing amine group(s) to the other unsaturated ethylene monomers in the shell is 1:99 to 25:75.

In an attempt to provide stable aqueous epoxy-containing emulsion systems which will thermoset on baking, the art has previously attempted to combine emulsions of acrylic copolymers, including an epoxy-reactive monomer (a maleic or fumaric half ester), with a separate emulsion of an epoxy resin as shown in Cline U.S. Pat. No. Re 25,880. However, when separate emulsions are used, many difficulties are encountered. First, these two emulsions frequently demand a large amount of emulsifying agent which degrades film properties. Also, compatibility with the high molecular weight acrylic polymer is poor, and gloss is limited. Moreover, contact of the two resins is limited so strong catalysts must be used, and package stability has been a problem. Also, and particularly with the high molecular weight epoxy resins, organic solvents have been needed for the epoxy emulsions.

To avoid some of these difficulties, water dispersible aliphatic epoxy resins have been used, but these have not been satisfactory because they are less reactive, they do not possess the superior physical properties of the aromatic polyepoxides, and package stability has been a problem since strong catalysts are again needed for the epoxy-carboxy cure.

U.S. Pat. No. 4,028,294 discloses a two phase latex having an epoxy resin component, which is preferably a water insoluble aromatic polyepoxide incorporated into at least one of the monoethylenic monomers (normally by dissolving), and a monomer which is reactive with the epoxy group (preferably a carboxyl-functional monomer). The monomers in the presence of the epoxy resin are copolymerized in an aqueous emulsion at a temperature below which the epoxy reactive monomer will react with the epoxy groups of the polyepoxide, and in the presence of a free radical polymerization catalyst, to provide a stable latex.

However, the prior art does not disclose a stable crosslinkable latex having an epoxy modified core-shell polymer in aqueous emulsion form, wherein the core polymer comprises an epoxy resin and an ethylenically unsaturated monomer, and the shell polymers comprises an ethylenically unsaturated monomer, and a hydroxyl of carboxyl functional monomer, both the core and shell being free of monomers containing amino groups.

The present invention is also directed to the use of said core-shell latices as a binder in the formation of nonwoven mats to be utilized in areas where heat resistance is important. These mats are useful in a variety of applications such as a component in roofing, flooring and filtering materials.

Specifically, these mats can be used in the formation of asphalt-like roofing membranes such as those used on flat roofs. Polyester mats about one meter in width can be formed, saturated with binder, and dried and cured to provide dimensional stability and integrity to the mats, thus allowing them to be rolled and transported to a converting operation where one or both sides of the mats are coated with molten asphalt. The binder utilized in these mats plays a number of important roles. If the binder composition does not have adequate heat resistance, the polyester mat will shrink when coated at temperatures of 170 to 250° C. with the asphalt. A heat resistant binder is also needed for roofing applications when molten asphalt is used to form seams and, later, to prevent the roofing from shrinking when exposed to elevated temperatures over extended periods of time. Said shrinking would result in gaps or exposed areas at seams where the roofing sheets are joined as well as at the perimeter of the roof.

Since the binders used in these structures are present in substantial amounts, i.e., on the order of about 25% by weight, the physical properties thereof must be taken into account when formulating for improved heat resistance. Thus, the binder must be stiff enough to withstand the elevated temperatures, but must also be flexible at room temperature so that the mat can be rolled or wound without cracking or creating other weaknesses which could lead to leaks during and after impregnation with asphalt.

Binders for use on nonwoven mats have conventionally been prepared from acrylate or styrene/acrylate copolymers.

In order to improve the heat resistance thereof, crosslinking functionalities have been incorporated into these copolymers.

Other techniques for the production of heat resistant roofing materials include those described in U.S. Pat. No. 4,539,254 involving the lamination of a fiberglass scrim to a polyester mat thereby combining the flexibility of the polyester with the heat resistance of the fiberglass.

This invention also relates to the use of these novel core-shell latices as laminating adhesives which form flexible laminates having high bond strength, and a high degree of both humidity and water resistance. These adhesives are prepared and employed in emulsion form, and on removal of the aqueous medium subsequent to application, the adhesives will cure harden at room temperature to form a flexible laminate having high bond strength, heat resistance, and a high degree of both humidity and water resistance.

The core-shell latices of the present invention are also useful in providing laminates of woven and non-woven fabrics where the fabric itself is of cotton, polyolefin, polyester, polyamide (nylon), etc.; coated and uncoated paper and paperboard; film such as polyvinylidene chloride (PVDC), polyester, PVDC coated polyester, oriented and non-oriented polyethylene and polypropylene film, metallic foils and metallized films; and flexible cellular material such as polyurethane foams or sponge rubber. These laminates can be made of similar or dissimilar laminae and are useful in a wide variety of end-use applications including for example flexible packaging, graphic arts and industrial uses such as weather stripping and electrical insulation.

The packaging industry, particularly the food packaging area thereof, is currently utilizing large quantities of flexible films. Since all properties desired in such laminates are not available in any one specific film the industry generally employs laminates prepared from a combination of films. Very often these laminates are formed from a film of polyethylene terephthalate (PET), polyamide or cellophane, either uncoated or coated with PVDC laminated to a heat sealable polyolefin film which has been treated by corona discharge for adhesion promotion.

In the prior art, the most satisfactory laminates indicated by industry acceptance have been formed with organic solvent-based urethane or polyester adhesives. Most of these adhesives, however, have the disadvantage of requiring organic solvents such as methyl ethyl ketone, ethyl acetate or alcohol in order to form an applicable solution. Due to the desirability of eliminating solvents from such adhesives because of their increasing costs, flammability as well as pollution considerations, the development of an aqueous emulsion adhesive system capable of performing comparably to the solvent adhesives becomes vital to the continued growth of the industry.

Water-borne laminating adhesives have been described in the prior art. For example, U.S. Pat. No. 3,905,931, describes a one-part water-based adhesive composition using an aqueous emulsion of about 55 to 80% of a poly (ethylacrylate), about 4 to 20% of an ethylene-acrylic acid copolymer (about 80 weight percent of ethylene and about 20 weight percent of acrylic acid) and about 8 to 20% of a 1,2-epoxy resin. Upon removal of water, this composition cures to a water-resistant thermally stable adhesive.

Other water-borne, two-part laminating adhesives are known and have been described as based on an aqueous dispersion of:

(a) a copolymer of a vinyl ester and/or an acrylic acid ester and/or further copolymerizable monomer(s), (b) an epoxy resin, and (c) an amine hardener catalyst.

The adhesives noted above employing an amine hardener catalyst are characterized as two-part adhesives, i.e., they are sold in two parts and must be combined in specified amounts by the user prior to their use in the laminating process. The packaging and selling of these adhesives in two parts (a component comprising an epoxy resin or epoxy resin and vinyl polymer and separate amine catalyst component) is necessary because of the inherent reactivity and instability of the adhesive when the two components are combined. Typically, a completed adhesive where the components have been combined exhibits a pot-life of less than 24 hours.

Because of the many inconveniences and disadvantages associated with the two-component latex compositions, there is considerable industry interest in stable one-part, ready-for-use latex compositions which eliminates formulation and pot-life problems.

Accordingly, there is still a need in industry for waterborne, one-part latex compositions which in use exhibits bond strength, water and humidity resistance, equal to or superior than the current two-part compositions.

OBJECT OF THE INVENTION

An object of the present invention is the preparation of a stable one-part adhesive which would eliminate an additional step for the user of mixing the two parts prior to use in the laminating process.

Another object of the present invention is the preparation of a core-shell latex which is shelf stable and crosslinks when the post-added amino compound reacts with the epoxy resin in the core upon drying or curing.

Still another object of the present invention is the use of these novel core-shell polymers in heat resistant binder applications.

Yet another object of the present invention is the use of these novel core-shell polymers as a corrugating adhesive.

Another object of the present invention is the use of these novel core-shell polymers in coating applications, including coatings on electronic devices and coatings on automotive parts.

Another object of the present invention is the use of these novel core-shell polymers in flexible packaging applications.

One further object is the use of the core-shell polymers of this invention as contact adhesives.

SUMMARY OF THE INVENTION

The present invention provides a stable crosslinkable core-shell polymer in aqueous emulsion form comprising:

(a) from 1 to 80% by weight core polymer comprising:
  (1) from 1 to 60% by weight of an epoxy resin, and
  (2) from 40 to 99% by weight of at least one ethylenically unsaturated monomer; and (b) from 20 to 99% by weight shell polymer comprising:
  (1) from 1 to 99.5% by weight of at least one ethylenically unsaturated monomer, and
  (2) from 0.5 to 10% by weight of a hydroxyl or carboxyl functional monomer, and providing that said monomers in both said core and shell do not contain amino functional groups; and (c) an organic compound which is post added to the formed core-shell polymer and has at least one amino functional group, wherein said amino group is available for later reaction with said epoxy resin upon drying to produce a crosslinked polymer product.

The method for producing the present epoxy core-shell polymer in aqueous emulsion form comprising:

(1) dissolving an epoxy resin in at least one ethylenically unsaturated monomer,
(2) emulsification of the epoxy resin (optional depending on the molecular weight of the epoxy resin),
(3) polymerizing said ethylenically unsaturated monomers to form the core,
(4) forming said shell on said core by polymerizing a second monomer composition in the presence of said core, said second monomer composition consisting essentially of 1 to 99.5% by weight of at least one ethylenically unsaturated monomer and 0.5 to 10% by weight of a hydroxyl or carboxyl functional monomer, providing that the monomers in the core and the shell do not contain amino functional groups, and
(5) post-adding an organic compound containing at least one functional amino group to the latex, wherein the amino group is available for later reaction with the epoxy resin upon curing (once the water in the system has evaporated or disappeared) to produce a crosslinked polymeric product.

When the epoxy resin has a high molecular weight it is important to perform an emulsifying step before dissolving the epoxy resin in the ethylenically unsaturated monomers.

The present invention also provides a laminating adhesive in aqueous emulsion form comprising a core-shell polymer in aqueous emulsion form having a glass transition temperature of −70 to 30° C., said polymer comprising:

(a) from 1 to 80% by weight core polymer comprising:
  (1) from 1 to 60% by weight of an epoxy resin, and
  (2) from 40 to 99% by weight of at least one ethylenically unsaturated monomer; and
(b) from 20 to 99% by weight shell polymer comprising:
  (1) from 1 to 99.5% by weight of at least one ethylenically unsaturated monomer, and
  (2) from 0.5 to 10% by weight of a hydroxyl or carboxyl functional monomer,
  providing that the monomers in the core and the shell do not contain amino functional groups; and
(c) an organic compound which is post-added to the formed core-shell polymer and having at least one amino functional group, wherein said amino group is available for later reaction with the epoxy upon drying to produce a crosslinked polymer product.

This invention also provides a process for the preparation of a flexible laminate comprising applying the laminating adhesive to a substrate selected from the group consisting of paper, paperboard, metallic foils, metallized and polymerized films, drying and laminating the first substrate to a second substrate by passing it through a hot nip roller, wherein the laminating adhesive is an aqueous emulsion of a core-shell polymer having a glass transition temperature (Tg) of −70 to 30° C., and comprising:

(a) from 1 to 80% by weight core polymer comprising:
  (1) from 1 to 60% by weight of an epoxy resin and
  (2) from 40 to 99% by weight of at least one ethylenically unsaturated monomer; and
(b) from 20 to 99% shell polymer comprising:
  (1) from 1 to 99.5% by weight of at least one ethylenically unsaturated monomer, and
  (2) from 0.5 to 10% by weight of a hydroxyl or carboxyl functional monomer,
  providing that the monomers in the core and the shell do not contain amino functional groups; and
(c) an organic compound which is post-added to the formed core-shell polymer and having at least one amino functional group wherein said amino group reacts with said epoxy resin upon drying to produce a crosslinked polymer product.

The present invention also provides a process for preparing a heat resistant binder comprising preparing a core-shell latex having a glass transition temperature (Tg) of 20 to 50° C., said latex comprising:

(a) from 1 to 80% by weight core polymer comprising:
  (1) from 1 to 60% by weight of an epoxy resin, and
  (2) from 40 to 99% by weight of at least one ethylenically unsaturated monomer; and
(b) from 20 to 99% by weight shell polymer comprising:
  (1) from 1 to 99.5% by weight of at least one ethylenically unsaturated monomer, and
  (2) from 0.5 to 10% by weight of a hydroxyl or carboxyl functional monomer,
  providing that said monomers in the core and the shell do not contain a mino functional groups; and
(c) an organic compound which is post-added to the formed core shell polymer and having at least one amino functional group, wherein said amino group reacts with said epoxy resin upon drying to produce a crosslinked polymer product.

The present invention also provides a heat resistant binder composition comprising a core-shell latex having a glass transition temperature (Tg) of 20 to 50° C., said latex comprising:

(a) from 1 to 80% by weight core polymer comprising:
  (1) from 1 to 60% by weight of an epoxy resin, and
  (2) from 40 to 99% by weight of at least one ethylenically unsaturated monomer; and
(b) from 25 to 99% by weight shell polymer comprising:
  (1) from 1 to 99.5% by weight of at least one ethylenically unsaturated monomer, and
  (2) from 0.5 to 10% by weight of a hydroxyl or carboxyl functional monomer,
  providing that the monomers in the core and the shell do not contain amino functional groups; and
(c) an organic compound which is post-added to the formed core shell polymer and having at least one amino functional group, wherein said amino group is available for later reaction with the epoxy resin upon drying to produce a crosslinked polymer product.

This invention further provides a contact adhesive composition comprising a core-shell polymer having a glass transition temperature (Tg) of −70 to 50° C., said latex comprising:

(a) from 1 to 80% by weight core polymer comprising:
  (1) from 1 to 60% by weight of an epoxy resin, and
  (2) from 40 to 99% by weight of at least one ethylenically unsaturated monomer; and
(b) from 25 to 99% by weight shell polymer comprising:
  (1) from 1 to 99.5% by weight of at least one ethylenically unsaturated monomer, and
  (2) from 0.5 to 10% by weight of a hydroxyl or carboxyl functional monomer,
  providing that the monomer in the core and the shell do not contain amino functional groups; and
(c) an organic compound which is post-added to the formed core-shell polymer and having at least one amino functional group, wherein said amino group is available for later reaction with the epoxy resin upon drying to produce a crosslinked polymer product.

DETAILED DESCRIPTION

The two stage polymerization process utilized herein may be carried out using a variety of specific modifications which are generally referred to as producing "core-shell" or "interpenetrating network" type polymers. Such polymerization procedures are described, for example, in U.S. Pat. Nos. 3,671,610; 3,833,404; and 4,616,057, the disclosures of which are incorporated herein by reference.

The compositions of this invention are prepared by an emulsion process, and preferably by a sequential emulsion polymerization process in which as a first polymerization step the core polymer is prepared in particulate form as a latex. The monomers of the shell polymer component are added and polymerized to form the encapsulating outer shell.

In accordance with this invention the core contains an epoxy resin component which is preferably a water insoluble aromatic polyepoxide which is dissolved in one or more ethylenically unsaturated monomers or a combination of monomers and polymers. The monomers in the presence of the dissolved epoxy resin are polymerized in an aqueous emulsion. The polymeric shell is formed on the core by emulsion polymerization of one or more ethylenically unsaturated monomers and a hydroxyl or carboxyl functional monomer in the presence of the core. There are no amino groups present in the core and shell monomer, and the composition is characterized in that the latex comprises a stable blend of two such latices.

Crosslinking of the particles in the core takes place upon drying of the blended latex and the addition of an organic compound containing at least one amino functional group which reacts with the epoxide to form a crosslinked polymeric product. Heating the latex at 50–150° C. will additionally enhance said crosslinking. It is further noted that the organic compound may be post-added to the latex composition immediately after the core-shell is formed or it can be post-added to the latex composition at a later time prior to use. In either case, the latex remains stable until reaction to form a crosslinked polymer product occurs upon curing or drying.

In both the core and shell stages of emulsion polymerization, the total amount of monomer(s) used may be present in the emulsion initially, or portions thereof may be added continuously during the polymerization.

In the formation of a latex of a core and shell polymer composition the monomers forming the core polymer may be first polymerized by emulsion polymerization, which can be carried out by conventional methods in the presence of an emulsifying surfactant and a free radical initiator. The monomer or monomers forming the shell polymer are sequentially added to the core polymer emulsion, and are polymerized to form the shell. An organic compound having at least one amino functional group is then added to the core-shell polymer. This amino group reacts with the epoxy resin upon film formation (drying) to form a crosslinked latex. The latex film may be heated, for example at 50–100° C., to ensure additional crosslinking.

Suitable polymerization catalysts are the water-soluble free-radical-formers generally used in emulsion polymerization, such as hydrogen peroxide, sodium persulfate, potassium persulfate and ammonium persulfate, as well as t-butyl hydroperoxide, in amounts of between 0.01 and 3% by weight, preferably 0.01 and 1% by weight based on the total amount of emulsion. They can be used alone or together with reducing agents such as sodium formaldehyde-sulfoxylate, ferrous salts, sodium dithionite, sodium hydrogen sulfite, sodium sulfite, sodium thiosulfate, as redox catalysts in amounts of 0.01 to 3% by weight, preferably 0.01 to 1% by weight, based on the total amount of the emulsion.

The polymerization is carried out at a pH of between 2 and 7, preferably between 3 and 5. In order to maintain the pH range, it may be useful to polymerize in the presence of customary buffer systems, for example, in the presence of alkali metal acetates, alkali metal carbonates, alkali metal phosphates. Polymerization regulators, like mercaptans, aldehydes, chloroform, ethylene chloride and trichloroethylene, can also be added in some cases.

The emulsifiers in the emulsion polymerization process can be anionic, cationic, or non-ionic surface-active compounds or mixtures thereof. Suitable anionic emulsifiers are, for example, alkyl sulfonates, alkylaryl sulfonates, alkyl sulfates, sulfates of hydroxyalkanols, alkyl and alkylaryl disulfonates, sulfonated fatty acids, sulfates and phosphates of polyethyoxylated alkanols and alkylphenols, as well as esters of sulfosuccinic acid. Suitable cationic emulsifiers are, for example, alkyl quaternary ammonium salts, and alkyl quaternary phosphonium salts. Examples of suitable non-ionic emulsifiers are the addition products of 5 to 50 moles of ethylene oxide to straight or branch-chained alkanols having 6 to 22 carbon atoms, or alkylphenols, or higher fatty acids, or higher fatty acid amides, or primary and secondary higher alkyl amines; as well as block copolymers of propylene oxide with ethylene oxide and mixtures thereof. When combinations of emulsifying agents are used, it is advantageous to use a relatively hydrophobic emulsifying agent in combination with a relatively hydrophilic agent. The amount of emulsifying agent is generally from about 1 to about 10, preferably about 2 to about 8, weight percent of the monomers used in the polymerization.

The emulsifier for the emulsion polymerization of the polymeric core is preferably a non-ionic or an anionic surfactant. The emulsifier is preferably used at 0.1 to 5% based on the total weight of polymer in the final polymer composition. The emulsifier used in the polymerization can be added, in its entirety, to the initial charge into the polymerization zone, or a portion of the emulsifier, e.g., from 90 to 25 percent thereof, can be added continuously or intermittently during polymerization. The many parameters of emulsion polymerization techniques can be adjusted by those skilled in the art to obtain particular desired results.

Various protective colloids may also be used in place of, or in addition to the emulsifiers described above. Suitable colloids include partially acetylated polyvinyl alcohol, e.g., up to 50 percent acetylated, casein, hydroxyethyl starch, carboxymethyl cellulose, gum arabic, and the like, as known in the art of synthetic emulsion polymer technology. In general, these colloids are used at levels of 0.05% to 4% by weight based on the total emulsion.

The polymerization initiator used in each step of the emulsion polymerization can be any of the known free radical initiators for additional polymerization, for example, a persulfate such as potassium persulfate, an azo catalyst such as azobisisobutyronitrile or an organic peroxide or per-ester. The free radical initiator may be of the redox type, for example persulfate with metabisulfite or dithionite. The amount of initiator used is generally 0.05 to 1.0% by weight based on the monomer(s) forming the polymeric shell in the second stage of the emulsion polymerization. The temperature of polymerization is in general in the range of 40 to 80° C. Low temperature polymerization may be preferred when polymerizing monomer compositions containing vinylidene chloride which boils at 32° C., although this monomer can alternatively be polymerized at higher temperatures under pressure.

Any epoxide may be employed for the purposes of this invention. However, it is preferred to employ water insoluble aromatic polyepoxides. The molecular weight and the 1,2 epoxy equivalence depends on the end use contemplated. Particularly useful epoxides are the polyglycidyl ethers and more particularly the diepoxides, especially the diglycidyl ether of bisphenol A. The polyglycidyl ethers may be normally liquid or solid, but the solid products normally require added organic solvents which are not needed nor used herein.

Epoxy resins have been prepared in a number of different manners, perhaps the most common of which is the reaction between epichlorhydrin and 2,2-bis(hydroxyphenyl) propane, commonly referred to hereinafter as bisphenol A, whereby a series of resins of different viscosity and epoxy equivalence is obtained by varying the component ratios and the reaction conditions. Other epoxides in addition to the epoxy resins of the epichlorhydrin-bisphenol A type include epoxidized novolac resins, formed by reaction of epichlorhydrin with the resinous reaction product of phenol (or substituted phenol) and formaldehyde, resinous reaction products of epichlorhydrin and an aliphatic polyol such as glycerol, 1,4-butanediol, poly(oxypropylene) glycol or similar polyalcoholic components, and resins obtained by epoxidation with peracetic acid.

A variety of epoxy resins, including, but not limited to, the members of the epoxy resin groups or types mentioned above, are effective components of the core composition of this invention. A preferred epoxy resin type for use in this invention is prepared by reaction of epichlorhydrin with bisphenol A, and several resins of varying properties within the epichlorhydrin-bisphenol A group. Particularly useful epoxy resins are those available commercially under the name Epon, a trademark of Shell Oil Company, Houston, Texas who make a family of epoxides such as diglycidyl ether of bisphenol A (Epon 828) and a polyepoxide which is a glycidyl ether of bisphenol A having a MW in the range of 350–4000 (Epon 834).

Epoxy reactive ethylenically unsaturated monomers which can be used in the shell include carboxylic acids such as acrylic acid, methacrylic acid, itaconic acid, fumaric or acids and esters thereof. Hydroxy functional monomers may also be used, such as the hydroxy alkyl esters of the above monoethylenic acids, illustrated by hydroxy ethyl acrylate.

The monomers used in both the core and the shell may consist of non-reactive ethylenic monomers, such as alkyl esters of acrylic and methacrylic acids, especially the C-1 to C-4 alkyl esters thereof, e.g., methacrylate, methyl, ethyl, propyl, and butyl acrylates or methacrylates, and the like. Styrene or vinyl toluene acrylonitrile and vinyl acetate may also be used.

Acrylic comonomers useful for both the core and shell portions include $C_1$–$C_{12}$ esters of acrylic and methacrylic acids including, but not limited to methyl acrylate, ethyl acrylate, n-butyl acrylate, isobutyl acrylate, n-propyl or iso-propyl acrylate, 2-ethylhexyl acrylate, as well as the corresponding methacrylates. The acrylic or methacrylic acid esters may include a hydroyalkyl group in place of the alkyl group. Thus, hydroxyalkyl acrylates such as, for example, 2-hydroxyethyl acrylate, 2-hydroxpropyl acrylate, 2-hydroxpropyl acrylate, and 2-hydroxyethyl methacrylate are also useful herein. Mixtures of compatible (meth) acrylate monomers may also be used.

Vinyl ester monomers may optionally be included in the core-shell monomer charges. Useful monomers include vinyl esters of an alkanoic acid containing from 1–13 carbon atoms, although vinyl acetate and vinyl propionate are preferred. Vinyl versatate, a branched vinyl ester containing 10 carbon atoms, is also a preferred monomer. Other vinyl esters which may be utilized herein include vinyl butyrate, vinyl valerate, vinyl pivalate, vinyl nonate, etc. Particularly with all acrylic systems, small amounts (up to about 12% by weight) of other copolymerizable comonomers may also be included in the monomer charges. Examples of such optional comonomers are styrene, alpha-methyl styrene, acrylonitrile, vinyl ethers, vinyl chloride, vinylidene chloride, fumarates and maleates. Optionally, with respect to the vinyl ester monomer used in the core and shell, up to about 30% of that monomer (for example, vinyl acetate) may be replaced with ethylene so that the resultant acrylate copolymer includes an interpolymerized ethylene/vinyl acetate component. The replacement can be effected in the core or shell or in both copolymers. The choice of the particular monomer(s) is largely dependent upon the requirements of the desired end-use of the adhesive. One skilled in the art would be able to select monomers and relative proportions which, for example, will produce a softer or harder copolymer, as desired.

The acrylic esters that can be employed in producing both the core and the shell include the alkyl esters of acrylic acid wherein the alkyl groups are saturated straight or branched chain radicals containing from 2 to 20 carbon atoms. Such acrylates as well as methods for their preparation are well known in the art. Illustrative examples of such acrylates that may be mentioned are ethyl acrylate, n-butyl acrylate, tertiary butyl acrylate, isobutyl acrylate, amyl acrylate, ethyl butyl acrylate, 2-ethylhexyl acrylate, octylacrylate, nonyl acrylate, decyl acrylate, tridecyl acrylate, tetra decyl acrylate, hexadecyl acrylate octa decyl acrylate, and the like.

The maleic esters that can be employed in producing the latex polymers of this invention are the alkyl esters of maleic acid, wherein the alkyl groups are saturated straight or branched chain radicals having from 2 to 20, preferably 2 to 10, carbon atoms. Such maleates as well as methods for their preparation are well known in the art. Illustrative examples of such maleates are dibutyl maleate, diethyl maleate, and the like.

The fumaric esters that can be employed in producing the latex polymer of this invention are the alkyl esters of fumaric acid, wherein the alkyl groups are saturated straight or branched chain radicals having 2 to 20, preferably 2 to 10, carbon atoms. Such fumarates as well as methods for their preparation are well known in the art. Illustrative examples of such fumarates are diethyl fumarate, dibutyl fumarate, and the like.

In addition to the monomers already listed, a pre-crosslinking monomer may be present in the core and the shell stages of the polymerization. The pre-crosslinking or "active crosslinking" monomer is one which provides immediate crosslinking and branching of the polymer during the initial formation of the emulsion polymer. Monomers of this type generally comprise compounds which contain 2 to 5 ethylenically unsaturated groups in one molecule separated by an ester or ether group, or by an aromatic or nitrogenous ring structure, where the unsaturated groups are capable of undergoing additional polymerization by free radical means. Suitable active crosslinking agents include alkylene glycol diacrylates and methacrylates, such as ethylene glycol diacrylate, 1,3-butylene glycol diacrylate, propylene glycol diacrylate, triethylene glycol dimethacrylate etc., 1,3- glycerol dimethacrylate, 1,1,1-trimethylol propane dimethacrylate, 1,1,1-trimethylol ethane diacrylate, pentaerythritol trimethacrylate, sorbitol pentamethacrylate, divinyl benzene, vinyl methacrylate, vinyl crotonate, vinyl acrylate, divinyl adipate; also di- and tri-allyl compounds, such as triallyl cyanurate, triallyl isocyanurate, diallyl phthalate, allyl methacrylate, allyl acrylate, diallyl maleate, diallyl fumarate, diallyl itaconate, diallyl malonate, diallyl carbonate, triallyl citrate, triallyl aconitate; also divinyl ether, ethylene glycol divinyl ether and the like. The amount of active crosslinking agent in each stage of the polymer emulsion of the present invention may vary from about 0.05 to 3.0 percent, preferably from about 0.1 to 0.5 percent by weight of the polymer.

Any organic compound containing one or more amino functional groups may be used in accordance with this invention and this includes any of the well known epoxy curing agents such as the aliphatic and aromatic amines. Preferred organic compounds are the polyamines including the diamines and especially the water soluble amines. Illustrative compounds which are useful include ethylene diamine, diethylene triamine, triethylenetetramine, tetraethylenepentamine, piperidine, N-aminoethylpiperazine, m-phenylenediamine, and isophorone diamine.

The amount of the organic compound in the amino functional groups that can be used can vary depending on the particular conditions and the properties desired. Generally an effective curing amount of the organic compound is used and this is controlled as known in the art by the relationship of amino and epoxy equivalents of the components in the composition. A wide range of 1:10 to 10:1 amine equivalent to epoxy equivalent and more particularly a range of 1:3 to 3:1 may be used.

The latex polymers of this invention have a wide degree of utility in the surface coatings field that is well known in the art. The instant latex polymers are particularly unique in that the polymers crosslink into a clear stable protective polymeric film coating merely upon drying, i.e., removal of the water from the latex. The highly crosslinked protective films derived from said latex polymers are very durable.

The present invention also provides a one-part laminating adhesive composition which incorporates an epoxy/acrylic polymer prepared by a "core-shell" emulsion polymerization process. We have found that the resultant adhesive compositions employing polymers which have polymer particles having a core portion surrounded by a shell portion have excellent bond strength, and water and humidity resistance equivalent to prior art two-part adhesives employing epoxy resins.

The monomers useful for preparing the latex polymer employed in the adhesives herein are selected to provide a core-shell polymer, wherein the core and shell polymer both will have a Tg of about −70 to 50° C. The weight ratio of core to shell monomers employed in preparing the polymer will range from about 1:99 to 80:20 and preferably from about 20:80 to 80:20, with more particularly preferred ratios ranging from 40:60 to 60:40. The copolymer composition is selected to contain a specific combination of monomers within defined ranges.

When the composition is used, it is understood that the heat from the "nip" step employed in the laminating process is sufficient to permit the functional comonomers to react with one another and thereby to initiate hardening, ionic bonding or crosslinking of the polymer. The core-shell technology is used herein to effectively separate the reactive functional comonomers until such time as reactivity is desired.

In the production of core-shell polymer, it is important that the surfactant system is designed to minimize or eliminate new particle formation during the second stage, i.e., polymerization of the shell. Ordinarily this is accomplished by having the core polymerization include all the micelle-forming surfactant (emulsifier), generally anionic surfactant. Typical useful surfactants (micelle-forming) for this stage include sodium lauryl sulfate, sodium lauryl ether sulfate, sodium dodecylbenzene sulfonate and sulfosuccinate esters. Other stabilizing surfactants (ordinarily non-ionic), such as ethoxylated alkyl phenols or ethoxylated lauryl alcohol may be used in conjunction with the micelle-forming surfactants in the core polymerization. In the shell polymerization stage the surfactant may be eliminated entirely or stabilizing, non-ionic surfactant(s) may be employed. Thus, in designing particular polymerization reaction sequences, the core polymerization should be conducted to promote polymer particle formation, while the subsequent shell polymerization should promote polymer formation on the core surface. At this time the inventor has no evidence that the "core-shell" polymers herein will contain a definitive interface between the core and the shell. In the multistage polymerization process employed in the present invention, the process is designed to first favor production of polymeric core particles followed by the polymerization of shell particles. For purposes of this invention, the "core-shell" copolymers described and produced by the multistage process herein are intended to include those copolymers which possess a core and shell and also those copolymers which possess a core and shell and an intermediate component. All of the copolymers useful in the invention herein will possess the latent reactivity of the functional comonomers polymerized therein. Core-shell polymerization is described in U.S. Pat. No. 4,091,162 and is incorporated by reference herein.

The core-shell polymers are produced and used at relatively high solids contents of 40% by weight and higher and preferably 50% by weight and higher. More particularly the core-shell polymers will have a solids content of from about 40 to 70% by weight and preferably from about 45 to 65% by weight. These relatively high solids polymers produced may if desired, be diluted with water.

For use as a laminating adhesive, the emulsion is generally prepared at a solids content of about 40 to 60% by weight. In addition to the components described above, additives which are conventionally used in laminating adhesives may also be included. Such additives include, for example, defoamers (preferably non-silicone types), salts, organic solvents, humectants, surfactants, etc. These additives, if used, are present in conventional concentrations well known to those skilled in the art.

The laminates of the present invention may contain laminae of a wide variety of flexible materials. Thus, suitable laminae include films of polyethylene and polypropylene generally treated for adhesion promotion; also polyester such as polyethylene terephthalate, cellophane and polyamide which may or may not be coated with PVDC for improved barrier properties. Preferably, dissimilar laminae are used where films, for example, of corona treated polypropylene or polyethylene are bonded to polyester, polyamide or PVDC coated cellophane or PVDC coated polyester, or paper. Also contemplated within the present invention are laminates prepared with woven and non-woven fabrics where the fibers are of cotton, polyester, polyolefin, polyamide, polyimide and the like; metallic foils such as aluminum foil; metallized films; paper and paperboard; and cellular flexible sheet material such as polyethylene or polyurethane foam, and sponge and foam rubber.

In forming the laminates of the present invention, conventional techniques known per se are employed to apply the adhesive emulsion to the film substrate. Thus, these adhesives may be applied by use of any mechanical coating process such as air knife, trailing blade, knife coater, reverse roll or gravure coating technique. Most commonly, the adhesive is coated on a film and allowed to dry at room temperature (or dried at moderate heat). The adhesive coated film is then laminated to the desired substrate, for example, a corona treated polyethylene or polypropylene film or other lamina by passing through a "hot nip" roller. The resultant laminate is characterized by the immediate formation of a strong bond which gains strength on room temperature (R.T.) as a result of polymeric hardening and curing.

The present core-shell polymer is also useful in heat resistant binder applications. The binders may be used in any conventional nonwoven manufacturing operation. For example, the polyester fibers may be collected as a web or mat using spun bonded, needle punched, entangled fiber, card and bond or other conventional techniques for nonwoven applications.

Other additives commonly used in the production of binders for these nonwoven mats may optionally be used herein. Such additives include ionic crosslinking agents, thermosetting resins, thickeners, flame retardants and the like.

The core-shell latices described herein may be useful as a heat resistant binder in polyester mats for use as roofing membranes, and in the production of nonwoven products including polyester, felt or rayon mats to be used as a backing for vinyl flooring where the vinyl is processed at high temperatures so that some heat resistance in the binder is required. Similarly, cellulosic wood pulp filters for filtering hot liquids and gases require heat resistant binders such as are disclosed herein.

The core-shell polymers of this invention are also useful as contact adhesives which are used widely in the furniture and construction industries (including household applications) as well as in the automotive and footwear industries. Contact adhesives are blends of latex or rubber, tackifiers and other additives supplied in solvent or aqueous dispersion form. They are typically applied to the surface of both substrates to be joined, dried to evaporate or remove the volatiles and then combined under pressure. The adhesive film forms a strong, peel-resistant bond.

The contact adhesive composition is comprised of the core-shell polymer of this invention which has a Tg of −70 to 50° C., preferably −40 to 20° C. and an effective tackifying amount of a tackifier. Useful tackifiers include rosin (e.g., wood, gum or tall oil), polymerized rosin, disproportionated rosin, phenolics, polyterpenes, terpene phenolics, and hydrocarbons (aromatic and aliphatic). Preferred tackifiers are rosin and modified rosin or rosin derivatives. The tackifiers typically have a softening point of from about 25 to 175° C. and are used in amounts of from about 10 to 150 parts, preferably about 10 to 50 parts per hundred parts by weight of core-shell polymer.

The following examples set forth below are working examples which serve to illustrate the present invention and are not to be regarded as limitative. All parts, percentages and proportions referred to herein and in the claims are by weight unless otherwise indicated.

EXAMPLE 1

This example illustrates the process of preparing a representative core polymer. The reaction was carried out in a 10-liter stainless steel reactor. The following charges were prepared:

(A) 564.8 g Triton (surfactant) x-301 (20%), 79.2 g Triton x-100 (surfactant), 84.8 g sodium vinyl sulfonate (25%), 0.4 g sodium acetate, 4 g $FeSO_4.7H_2O$ (1% solution in water), 2 g sodium formaldehyde sulfoxylate, and 2864 g water.

(B) 2560 g vinyl acetate, 640 g Epon 828 (diglycidyl ether of bisphenol A).

(C) 8 g t-butyl hydrogen peroxide, 200 g water.

(D) 8 g sodium formaldehyde sulfoxylate, 200 g water.

(E) 4 g t-butyl hydrogen peroxide, 4 g water.

(F) 4 g sodium formaldehyde sulfoxylate, 40 g water.

Charge A was adjusted to pH 4.0 with phosphoric acid. Charge B was then added slowly to A under agitation to form a preemulsion. This preemulsion was then passed through a microfluidizer twice. The preemulsion was then added at 200 rpm agitation, the jacket control set to 50° C. and equilibrated. At 40° C., the reactor was pressurized with ethylene to 200 psi and equilibrated at this temperature for 15 minutes. At the end of the equilibration period, charge C and D were started and added uniformly over a 5 hour period. After initiation, the bath temperature was raised to 55° C. and the reaction temperature was allowed to increase to 60° C. After the addition was complete, charges E and F were added. Thirty minutes later, the mixture was cooled and discharged.

The physical properties of the polymer are described in Table I as polymer 1. The procedure was then repeated using different epoxies and amounts thereof and different ethylene pressure and the polymers produced were designated polymer 2 to 4 and were reported in Table I. Since it is difficult to determine the precise amount of ethylene present in the copolymer, the ethylene present in the compositions identified in Table I is defined in terms of the Tg of the final copolymer as well as the pressure of the ethylene charge. Normally, a −15° C. Tg corresponds to approximately 25–30% ethylene.

TABLE I

Compostion and Physical Properties

| Polymer | Epon 828 | Epon 834 | VA[1] | Pressure (psi) | Tg °C. | Solids | Visc (cps) |
|---|---|---|---|---|---|---|---|
| 1 | 20 | — | 80 | 200 | 12 | 44.9 | 55 |
| 2 | 20 | — | 80 | 600 | −3 | 39.8 | 23 |
| 3 | 40 | — | 60 | 500 | −4 | 41.8 | 70 |
| 4 | — | 20 | 80 | 600 | 7 | 43.9 | 30 |

[1]Vinyl acetate

EXAMPLE 2

This example illustrates the process of preparing the polyvinyl acetate/epoxy core polymer. The reaction was carried out in a 2-liter, 4-neck glass reactor. The following charges were prepared.

(A) 70.6 g Triton x-301 (20% surfactant), 9.9 g Triton x-100 (surfactant), 10.6 g sodium vinyl sulfonate (25%), 0.05 g sodium acetate, 1 g $FeSO_4$-.$7H_2O$ (1° solution in water).

(B) 0.2 g sodium formaldehyde sulfoxylate, 5 g water.

(C) 320 g vinyl acetate, 80 g Epon 828 (diglycidyl ether of bisphenol A).

(D) 1 g t-butyl hydrogen peroxide, 25 g water.

(E) 1 g sodium formaldehyde sulfoxylate, 25 g water.

Charge A was adjusted to pH 4.0 with phosphoric acid and charged to the reactor. Charge B was then added and purged by nitrogen for 1 hour. Charge C was then added under agitation. At 50° C., charges D & E were started. After initiation, the reaction temperature was controlled at 55° C. After the cessation of exothermic reactions, the charges D & E were continued for another 30 minutes (2 hours slow-add rate). The resulting polymer had 44.8 solids, 0.002% grit, and 445 cps in viscosity.

EXAMPLE 3

This example is the same as Example 2, except mixtures of charges A, B, and C were homogenized by an Epenbach mixer. The resulting polymer had 45.2% solids, 0.001% grit, and 325 cps in viscosity.

EXAMPLE 4

This example illustrates the preparation of the EVA/Epoxy core and acrylic shell polymer for a laminating adhesive.

The reaction was done in a 2-liter 4-neck glass reactor. The following charges were prepared:

(A) 598 g core polymer 3 from Example 1.
(B) 0.2 g sodium formaldehyde sulfoxylate, 30 g water.
(C) A preemulsion of 250 g butyl acrylate, 5 g methacrylic acid, 5 g acrylic acid in 10 g Triton x-305 (70% surfactant), 15 g Aerosol A-102 (31% surfactant) and 50 g water.
(D) 1.5 g t-butyl hydrogen peroxide, 25 g water.
(E) 1.5 g sodium formaldehyde sulfoxylate, 25 g water.

Charges A and B were added to the reactor and purged by nitrogen for 30 minutes. At 55° C., charges D and E were uniformly slow-added for 3 hours, while charge C was slow-added for 2 hours. After all the charges were slow-added to the reactor, held for 30 minutes, then cooled and discharged. The resulting copolymer had 52.9% solids, 0.01% grit, 130 cps in viscosity, and 230 nm in particle size. This copolymer reacted with 10% by weight isophorone diamine (26% solids) to give a crosslinked polymer product which showed good performance as a laminating adhesive. It gave 215 g initial bond strength, 190 g after 24 hours and PVDC tearing in bonding the Mylar/PVDC and corona treated low density polyethylene after 7 days.

EXAMPLE 5

This example illustrates the preparation of the EVA/Epoxy core and acrylic shell polymer for a heat resistant binder. The reaction was done in a 2-liter 4-neck glass reactor. The following charges were prepared.

(A) 556 g polymer 1 from Example 1.
(B) 0.2 g sodium formaldehyde sulfoxylate, 30 g water.
(C) A preemulsion of 125 g ethyl acrylate, 20 g methacrylic acid, 5 g hydroxy propyl methacrylate, and 125 g methyl methacrylate in 10 g Triton x-305 (70% surfactant), 15 g Aerosol A-102 (31% surfactant), and 50 g water.
(D) 1.5 g t-butyl hydrogen peroxide, 25 g water.
(E) 1.5 g sodium formaldehyde sulfoxylate, 25 g water.

This procedure is the same as in Example 4 except charge C was slow added for 3 hours, and charges D & E were slow-added for 4 hours. The resulting core-shell polymer had 54.6% solids, 0.003% grit, 270 cps in viscosity, and 252 nm in particle size. This polymer reacted with 4.25% isophorone diamine (26%) to give good performance as an acrylic/NMA latex in heat resistant binder applications.

COMPARATIVE EXAMPLE 1

This example compares the latex disclosed in U.S. Pat. No. 4,028,294 to the core-shell latex of the present invention. About 5% isophorone diamine (26%) was post-added to the core latex of Example 1. The mixture gelled within five (5) hours, resulting in an unstable core latex. However, post-adding the diamine to the core-shell latex of Example 5 yields a stable latex which retained its stability for more than one (1) month.

COMPARATIVE EXAMPLE 2

Comparative Examples 2 and 3 compare the core-shell latex disclosed in Japanese Patent Application No. 63-223018A to the core-shell latex of the present invention. In these examples the secondary amine was copolymerized in the shell and the latex coagulated, whereas in Example 4 of the present invention, post-adding the isophorone diamine to the core-shell latex resulted in a stable, core-shell latex (no coagulation).

This example illustrates the preparation of the EVA/Epoxy core and amino group and ethylenic unsaturated monomers in the shell. The reaction was done in a 2-liter 4-neck glass reactor. The following charges were prepared:

(A) 314 g polymer 2 from Example 1.
(B) 0.2 g sodium formaldehyde sulfoxylate, 20 g water.
(C) A preemulsion of 750 g butyl acrylate, 5 g methacrylic acid, 5 g acrylic acid in 10 g Triton x-305, 15 g Aerosol A-102 (31% surfactant), and 50 g water.
(D) 1.5 g t-butyl hydrogen peroxide, 25 g water.
(E) 1.5 g sodium formaldehyde sulfoxylate, 25 g water.
(F) 30 g butyl acrylate, 5 g t-butyl amino ethyl methacrylate, 1.6 g acetic acid.

This procedure is the same as in Example 4, except charge F (containing the amino group) was slow-added to the shell (instead of being post-added) for 15 minutes. After 1 hour and 45 minutes of slow-adding charge C, the latex coagulated during the slow-addition of charge F, whereas the core-shell latex of Example 4 was stable (did not coagulate).

COMPARATIVE EXAMPLE 3

This example illustrates the preparation of the EVA/Epoxy core and amino group and ethylenic unsaturated monomers in the shell. The reaction was done in a 2-liter, 4-neck glass reactor. The following charges were prepared:

(A) 628 g polymer 2 from Example 1.
(B) 0.2 g sodium formaldehyde sulfoxylate, 30 g water.
(C) A preemulsion of 210 g butyl acrylate, 5 g methacrylic acid, 5 g acrylic acid in 10 g Triton x-305, 15 g Aerosol A-102 (31% surfactant), and 50 g water.
(D) 1.5 g t-butyl hydrogen peroxide, 25 g water.
(E) 1.5 g sodium formaldehyde sulfoxylate, 25 g water.
(F) 40 g butyl acrylate, 10 g t-butyl amino ethyl methacrylate.

This procedure is the same as in Example 4 except charge F (containing the amino groups) was slow-added to the shell (instead of being post-added) for 30 minutes after 2 hours of the slow-addition of charge C, the latex coagulated 10–20 minutes after starting the slow-addition of charge F; whereas the core-shell latex of Example 4 was stable.

EXAMPLE 6

This example illustrates the process of preparing polyvinyl acetate/butyl acrylate/epoxy core latex. The polymerization was carried out in a 2-liter 4-neck glass reactor. The following charges were prepared.

(A) 5.0 g Triton (surfactant) X-301 (20%), 0.2 g sodium formaldehyde sulfoxylate, 0.1 g sodium acetate, 0.5 g $FeSO_4.7H_2O$ (1% solution in water), 150 g water.

(B) 500 g water, 90 g Triton X-301 (20% surfactant), 12 g Triton X-100 (surfactant), 13 g sodium vinyl sulfonate (25% solution), 10 g dodecyl benzene sulfonate (20% solution), 350 g vinyl acetate, 150 g butyl acrylate, 100 g Epon 834 (polyepoxide which is a glycidyl ether of bisphenol A).

(C) 1 g tertiary butyl hydrogen peroxide (t-BHP), 25 g water.

(D) 1 g sodium formaldehyde sulfoxylate, 25 g water.

Charge A was adjusted to pH 4.0 with phosphoric acid and charged to the reactor. Then 10% of charge B was added to the reactor and purged with nitrogen for 30 minutes. At 50° F., charges C and D were slow-added with 5 hour rate. After initiation, the reaction temperature was controlled at 55° C. After cessation of exothermic reactions, charge B was slow-added over 4 hours. The charges C and D were continued for another 30 minutes. The resulting latex has 42.3% solids, 30 cps in viscosity, and 154 nm in particle size.

EXAMPLE 7

This example illustrates the preparation of the core/shell latex as a base for contact adhesive. The reaction was done in a 2-liter 4-neck glass reactor. The following charges were prepared.

(A) 100 g water, 0.4 g Triton X-305 (70% surfactant), 0.2 g sodium formaldehyde sulfoxylate.

(B) 425 g latex of Example 6.

(C) 54 g water, 16 g Triton X-305, 19.4 g Aerosol A-102, 95 g butyl acrylate, 175 g ethyl acrylate, and 18 g acrylic acid.

(D) 1 g ammonium persulfate, 30 g water.

(E) 1 g sodium formaldehyde sulfoxylate

A and B were charged to the reactor and purged with nitrogen over 30 minutes. At 55° C., charge C was slow-added over 2 hours, while charges D and E were slow-added over 3 hours. The resulting latex has 50.2% solids, 50 cps in viscoisity, and 201 nm in particle size.

To prepare a contact adhesive formulation, 100 parts of the core-shell polymer prepared as described above in this Example was mixed with 44.8 parts Dresinol 215 polymerized rosin (Hercules Inc.), 4.9 parts polyvinyl alcohol (20%), 0.9 part formaldehyde, 0.9 part water, 0.3 part thickener, 0.3 part propylene glycol, and 1.8 parts isophorone diamine (26%). The adhesive was then coated on particle board and Formica high pressure laminate with a #40 wire wound bar, dried for 2.5 minutes at 250° F. Subsequently, the coated substrates were nip-roll mated and the results indicated that this adhesive gave good hot green strength and bonding range.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

What is claimed:

1. A stable one-part latex composition produced by an aqueous emulsion polymerization method wherein a core-shell polymer is formed, said method comprising:

(a) forming a core polymer by emulsion polymerization, said core polymer comprising:
    (1) from 1 to 60% by weight of an epoxy resin, and
    (2) from 40 to 99% by weight of at least one ethylenically unsaturated monomer; and (b) forming a shell polymer on said core by emulsion polymerization of a second monomer composition in the presence of said core, said monomer composition comprising;
    (1) from 1 to 99.5% by weight of at least one ethylenically unsaturated monomer; and
    (2) from 0.5 to 10% by weight of a hydroxyl or carboxyl functional monomer; providing that said monomers in both said core and shell do not contain amino functional groups and wherein said core-shell polymer comprises from 1 to 80% by weight of the core polymer and from 20 to 99% by weight of the shell polymer; and (c) post-adding to the formed core-shell polymer composition an effective curing amount of an organic compound containing at least one amino functional group which is available for later reaction with said epoxy resin upon drying to produce a crosslinked polymer product.

2. The latex composition of claim 1 wherein the core comprises a diglycidyl ether of bisphenol A and vinyl acetate.

3. The latex composition of claim 1 wherein the core-shell polymer has a solids content of at least 40%.

4. The latex composition of claim 1 wherein the core-shell polymer has a Tg of −70 to 50° C.

5. The latex composition of claim 4 wherein the weight ratio of the core to shell monomers used is from about 40:60 to 60:40.

6. The latex composition of claim 4 wherein the epoxy resin is a water insoluble aromatic polyepoxide and the amino containing organic compound is a polyamine.

7. The latex composition of claim 4 wherein the core comprises a diglycidyl ether of bisphenol A and vinyl acetate and the amino containing organic compound is a polyamine.

8. A laminating adhesive comprising the latex composition of claim 1 wherein the core-shell polymer has a Tg of −70 to 30° C. and a solids content of at least 40% by weight.

9. The laminating adhesive of claim 8 wherein the epoxy resin is a water insoluble aromatic polyepoxide and amino containing organic compound is a polyamine.

10. A heat resistant binder comprising the latex composition of claim 1 wherein the core-shell polymer has a Tg of 20 to 50° C. and a solids content of at least 40% by weight.

11. The heat resistant binder of claim 10 wherein the epoxy resin is a water insoluble aromatic polyepoxide and the amino containing organic compound is a polyamine.

12. A contact adhesive comprising the latex composition of claim 1 wherein the core-shell polymer has a Tg of −70 to 50° C. and an effective tackifying amount of a tackifer.

13. The contact adhesive of claim 12 wherein the tackifier is rosin or a rosin derivative.

14. The contact adhesive of claim 12 wherein the core-shell polymer has a Tg of −40 to 20° C. and a solids content of at least 40% by weight.

15. The contact adhesive of claim 14 wherein the epoxy resin is a water insoluble aromatic polyepoxide and the amino containing organic compound is a polyamine.

16. The contact adhesive of claim 15 wherein from about 10 to 150 parts by weight of the tackifier is used per hundred parts by weight of the core-shell polymer.

17. The contact adhesive of claim 16 wherein the tackifier is rosin or a rosin derivative.

18. The contact adhesive of claim 17 wherein the core comprises a polyepoxide which is a glycidyl ether of bisphenol A, vinyl acetate and butyl acrylate.

* * * * *